United States Patent Office 2,917,521
Patented Dec. 15, 1959

2,917,521

HEMIACETAL ESTER EPOXIDES

Benjamin Phillips, Charleston, and Donald L. Heywood, South Charleston, W. Va., assignors to Union Carbide Corporation, a corporation of New York No Drawing. Application March 6, 1957
Serial No. 644,197

13 Claims. (Cl. 260—348)

This invention is directed to novel hemiacetal ester epoxides, and, more particularly, to aldehyde 3,4-epoxy-cyclohexylmethyl hemiacetal esters.

Our aldehyde 3,4-epoxycyclohexylmethyl hemiacetal esters, hereinafter to be referred to also as the epoxides, can be represented by the formula:

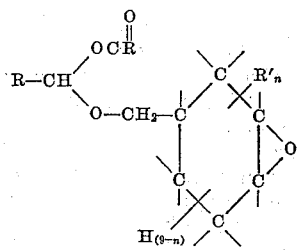

wherein R is a monovalent group from the class of saturated aliphatic hydrocarbon and monocyclic aromatic hydrocarbon groups free from olefinic or acetylenic unsaturation and need not be the same throughout the ester molecule; R′ is a lower alkyl group; and $n$ is an integer not greater than 9, and preferably from 0 to 5. Thus, aldehyde lower alkyl ring-substituted 3,4-epoxycyclohexylmethyl hemiacetal esters are represented by the formula when $n$ is 1 to 9 and aldehyde unsubstituted 3,4-epoxycyclohexylmethyl hemiacetal esters are represented by the formula when $n$ equals 0. By the term "lower alkyl group," as used herein, is meant an alkyl group having from 1 to 6 carbon atoms. Preferred aldehyde 3,4-epoxycyclohexylmethyl hemiacetal esters are those represented by the foregoing formula in which R contains from 1 to 17 carbon atoms, particularly 1 to 12 carbon atoms, since the epoxides having more than 18 carbon atoms, while being useful, are not economically feasible. Preferred epoxides are those in which the R groups are alkyl or aryl, for example, the alkylaldehyde 3,4-epoxycyclohexylmethyl hemiacetal alkanoates, arylaldehyde 3,4-epoxycyclohexylmethyl hemiacetal alkanoates, alkylaldehyde 3,4-epoxycyclohexylmethyl hemiacetal arylcarboxylates and the arylaldehyde 3,4-epoxycyclohexylmethyl hemiacetal arylcarboxylates. Particularly preferred epoxides are the alkylaldehyde 3,4-epoxycyclohexylmethyl hemiacetal alkanoates which can be represented by the foregoing formula wherein R represents alkyl.

The aldehyde 3,4-epoxycyclohexylmethyl hemiacetal esters are attractively useful in the manufacture of high purity dihydroxycyclohexylmethanols, such as, 3,4-dihydroxycyclohexylmethanol, 3,4-dihydroxy-6-methylcyclohexylmethanol, 3,4-dihydroxy-1-methylcyclohexylmethanol, 3,4-dihydroxy-5-methylcyclohexylmethanol and the like. In this connection our epoxides readily hydrolize under reflux at atmospheric pressure in water containing about one weight percent hydrogen chloride to form 1 molecule of the corresponding dihydroxycyclohexylmethanol, 1 molecule of carboxylic acid and 1 molecule of the corresponding aldehyde for each molecule of the epoxide hydrolyzed. Water, hydrogen chloride and the other organic by-products can then be stripped at reduced pressure to give high purity dihydroxycyclohexylmethanol. The dihydroxycyclohexylmethanols thus formed are themselves useful materials, for example, as solvents for a variety of organic chemicals, as hardeners for epoxy resins and as intermediates in the manufacture of a large variety of chemicals.

Our epoxides can be prepared by the epoxidation of olefinic double bonds of corresponding 3-cyclohexenyl-methyl hemiacetal esters with suitable epoxidizing agents. The epoxidation of the aldehyde 3-cyclohexenylmethyl hemiacetal ester starting materials can be represented by the equation:

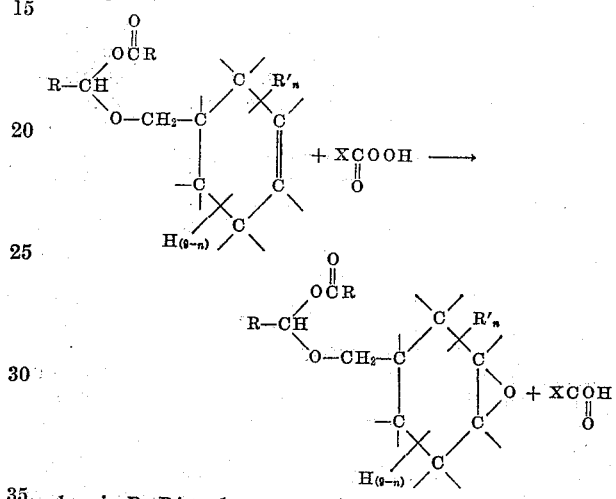

wherein R, R′ and $n$ are previously defined and

represents the epoxidizing agent and

represents the residue of epoxidizing agent after epoxidation. Typical epoxidizing agents are the peracids, e.g., peracetic acid, perpropionic acid, perbenzoic acid and the like, or the aldehyde monoperacylates, e.g., acetaldehyde monoperacetate and propionaldehyde monoperpropionate. Of these epoxidizing agents the 2 to 3 carbon aliphatic peracids, particularly peracetic acid, and the 2 to 3 carbon aliphatic aldehyde mono- (2 to 3 carbon aliphatic)-peracylates, particularly acetaldehyde monoperacetate, are preferred mainly from the aspect of being economically available and producing commercially acceptable yields. Many epoxidizing agents in crystalline form or highly concentrated solutions are highly explosive when exposed to physical shocks, sometimes of the very slightest magnitude. Possible explosion hazards are avoided by preventing the formation of crystalline forms or highly concentrated solutions of epoxidizing agent. This can be safely accomplished by employing in the epoxidation solutions containing below about 60 weight percent of epoxidizing agent. Ethyl acetate and acetone are two of the many solvents available for peracetic acid or acetaldehyde monoperacetate. It is particularly important that the epoxidation be carried out in the absence of heavy metal ions or strong acids and water so as to avoid the hydrolysis of the easily hydrolyzable hemiacetal ester starting materials and products.

The epoxidation is advantageously carried out at temperatures in the range of −10 to 100° C. At temperatures below this range epoxidation takes place at a very slow rate and above this range side reactions produce undesired materials and reduce the yield. Molar ratios of epoxidizing agent to aldehyde 3-cyclohexenylmethyl hemiacetal ester starting material can be varied over a wide range, for example, from 0.3 to 2.0, with molar ratios between 0.8 and 1.2 being preferred, however. Molar ratios above 2.0 may be employed, although the formation of other materials brought about by such higher ratios require extensive separation methods. Molar ratios below 0.3 may also be employed but the low yield of product makes the use of such ratios impractical. The epoxidation time required to produce our aldehyde 3,4-epoxycyclohexylmethyl hemiacetal esters will depend upon the epoxidation temperature, the molar ratios employed and the yield desired. Any suitable method for isolating the product, such as, fractionation, crystallization and the like can be employed.

A typical epoxidation which uses acetaldehyde 3-cyclohexenylmethyl hemiacetal acetate as starting material to produce the acetaldehyde 3,4-epoxycyclohexylmethyl hemiacetal acetate illustrates the method used to produce the several aldehyde 3,4-epoxycyclohexylmethyl hemiacetal esters of our invention. In this typical epoxidation, a 26.7 weight percent solution of peracetic acid in acetone was added continuously over a period of 1 hour to acetaldehyde 3-cyclohexenylmethyl hemiacetal acetate. The molar ratio of peracetic acid to the hemiacetal acetate was about 1.0 and the total weights of reactants were 20.7 grams of peracetic acid and 52 grams of the unsaturated hemiacetal acetate. The temperature of the reaction mixture during the addition of peracetic acid was maintained at about −5° C. and the mixture was continually stirred during the entire addition. After adding all of the peracetic acid the reaction mixture was stirred for 23 additional hours while maintaining the temperature at about −5° C. and then for 4.5 hours at 26° C. At the end of this period, titration to determine peracetic acid content by conventional methods indicated that about 97.9 percent of the acid originally charged had been consumed.

The reaction mixture was fed into ethylbenzene refluxing at reduced pressure and stripped of low-boiling materials, e.g., ethyl acetate, unreacted peracetic acid and acetic acid (as an azeotrope with ethylbenzene) leaving 52 grams of residue containing 94.5 weight percent of acetaldehyde 3,4-epoxycyclohexylmethyl hemiacetal acetate (as determined by titration of epoxide in pyridine hydrochloride). This amount of product represented an 87 percent yield based on theoretical. The residue was fractionated to provide a 99.8 percent pure product, as determined from its saponification equivalent. Acetaldehyde 3,4-epoxycyclohexylmethyl hemiacetal acetate, thus formed, had a boiling point of 122° C. at 3.0 millimeters of mercury reduced pressure and a sodium light index of refraction of 1.4532 at 30° C.

Similar epoxidations can be performed on other aldehyde 3-cyclohexenylmethyl hemiacetal esters with, however, the replacement of acetaldehyde 3-cyclohexenylmethyl hemiacetal acetate, respectively, by acetaldehyde 3-cyclohexenylmethyl hemiacetal stearate, pelargonaldehyde 3-cyclohexenylmethyl hemiacetal butyrate, benzaldehyde 3-cyclohexenylmethyl hemiacetal acetate, phenylacetaldehyde 6-methyl-3-cyclohexenylmethyl hemiacetal propionate, butyraldehyde 3-methyl-3-cyclohexenyl methyl hemiacetal benzoate, isobutyraldehyde 1-methyl-3-cyclohexenylmethyl hemiacetal acetate, stearaldehyde 6-methyl-3-cyclohexenylmethyl hemiacetal phenylacetate, acetaldehyde 2,2,5,5,6-pentamethyl-3-cyclohexenylmethyl hemiacetal acetate and 2,4,6-triethylbenzaldehyde 3-cyclohexenylmethyl hemiacetal acetate to produce, respectively, acetaldehyde 3,4-epoxycyclohexylmethyl hemiacetal stearate, pelargonaldehyde 3,4-epoxycyclohexylmethyl hemiacetal butyrate, benzaldehyde 3,4-epoxycyclohexylmethyl hemiacetal acetate, phenylacetaldehyde 3,4-epoxy-6-methylcyclohexylmethyl hemiacetal propionate, butyraldehyde 3,4-epoxy-3-methylcyclohexylmethyl hemiacetal benzoate, isobutyraldehyde 3,4-epoxy-1-methylcyclohexylmethyl hemiacetal acetate, stearaldehyde 3,4-epoxy-6-methylcyclohexylmethyl hemiacetal phenylacetate, acetaldehyde 3,4-epoxy-2,2,5,5,6-pentamethylcyclohexylmethyl hemiacetal acetate and 2,4,6-triethylbenzaldehyde 3,4-epoxycyclohexylmethyl hemiacetal acetate. Molar ratios of peracetic acid to the respective aldehyde 3-cyclohexenylmethyl hemiacetal esters, reaction temperatures and approximate reaction times of all of these epoxidations are essentially the same as the molar ratio, reaction temperature and reaction time of the acetaldehyde 3-cyclohexenylmethyl hemiacetal acetate epoxidation described above. Separations of the products are conducted by procedures which are similar to the separation procedures described above for isolating acetaldehyde 3,4-epoxycyclohexylmethyl hemiacetal acetate, or by any other suitable separation methods and the percent yields and purities of product are of the same approximate magnitude.

Aldehyde 3-cyclohexenylmethyl hemiacetal esters which are starting materials in the production of our aldehyde 3,4-epoxycyclohexylmethyl hemiacetal esters can be prepared by methods known in the art. A typical preparation of the starting materials involves the reaction of an aldehyde and a 3-cyclohexenylmethanol (with catalysis by a trace of strong acid, such as, HCl) to give the corresponding hemiacetal, which may not be isolated but reacted further with the corresponding acyl chloride to provide the hemiacetal starting material. Other methods of preparing the starting hemiacetal esters are also well known in the art.

Our epoxides are also useful in the preparation of synthetic resins and, also, as stabilizers for chlorine-containing resins such as polyvinyl chloride, polyvinylidene chloride, chlorinated rubbers, and the like.

What is claimed is:

1. An aldehyde 3,4-epoxycyclohexylmethyl hemiacetal ester having the formula:

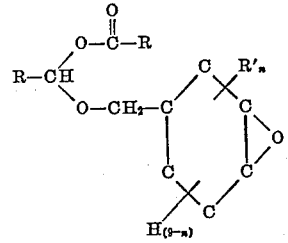

wherein R is a member selected from the class consisting of alkyl and phenyl groups; said alkyl group having from 1 to 17 carbon atoms; R′ is an alkyl group of from 1 to 6 carbon atoms; and n is an integer of from 0 to 5.

2. An unsubstituted alkylaldehyde 3,4-epoxycyclohexylmethyl hemiacetal alkanoate having not more than 17 carbon atoms in either alkyl group.

3. An unsubstituted alkylaldehyde 3,4-epoxycyclohexylmethyl hemiacetal benzoate having not more than 17 carbon atoms in the alkyl group.

4. Benzaldehyde 3,4-epoxycyclohexylmethyl hemiacetal alkanoate having not more than 17 carbon atoms in the alkyl group.

5. An unsubstituted alkylaldehyde lower alkyl ring-substituted 3,4-epoxycyclohexyl methyl hemiacetal alkanoate having from 1 to 5 lower alkyl ring-substituents and not more than 17 carbon atoms in each of the remaining 2 chains originating at the aldehydic carbon atom.

6. An unsubstituted benzaldehyde lower alkyl ring-substituted 3,4-epoxycyclohexylmethyl hemiacetal benzoate having from 1 to 5 lower alkyl ring-substituents.

7. Acetaldehyde 3,4-epoxycyclohexylmethyl hemiacetal alkanoate.

8. Pelargonaldehyde 3,4 - epoxy-1-methylcyclohexylmethyl hemiacetal butyrate.

9. Benzaldehyde 3,4-epoxycyclohexylmethyl hemiacetal acetate.

10. Benzaldehyde 3,4-epoxycyclohexylmethyl hemiacetal benzoate.

11. Acetaldehyde 3,4-epoxycyclohexylmethyl hemiacetal acetate.

12. Acetaldehyde 3,4-epoxy-1-methylcyclohexylmethyl hemiacetal acetate.

13. Acetaldehyde 3,4-epoxy-6-methylcyclohexylmethyl hemiacetal acetate.

No references cited.

UNITED STATES PATENT OFFICE

CERTIFICATE OF CORRECTION

Patent No. 2,917,521                                                    December 15, 1959

Benjamin Phillips et al.

It is hereby certified that error appears in the printed specification of the above numbered patent requiring correction and that the said Letters Patent should read as corrected below.

Column 1, lines 21 to 26, for that portion of the formula reading

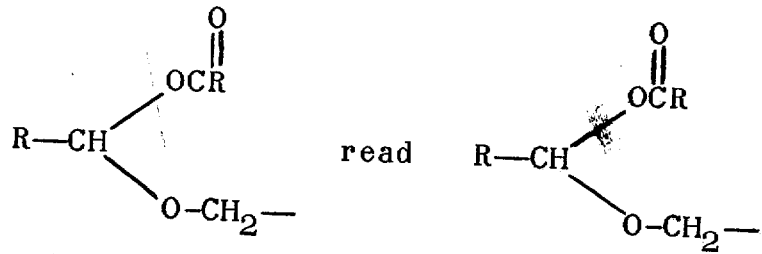

Signed and sealed this 2nd day of August 1960.

(SEAL)
Attest:

KARL H. AXLINE
Attesting Officer

ROBERT C. WATSON
Commissioner of Patents